Figure 1:
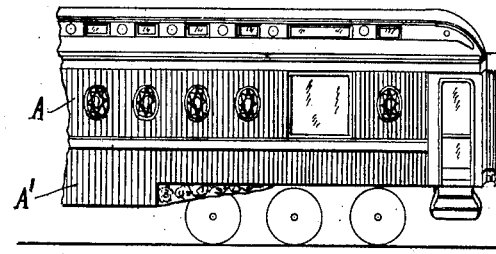

No. 829,469. PATENTED AUG. 28, 1906.
L. J. HARRIS.
PARLOR AND SLEEPING CAR HAVING ELECTRICALLY CONTROLLED BERTHS.
APPLICATION FILED MAY 23, 1906.

6 SHEETS—SHEET 1.

Witnesses
J. Garcia
Rob. Schwarz

L. J. Harris Inventor
By his Attorney J. O. Parker

No. 829,469. PATENTED AUG. 28, 1906.
L. J. HARRIS.
PARLOR AND SLEEPING CAR HAVING ELECTRICALLY CONTROLLED BERTHS.
APPLICATION FILED MAY 23, 1906.
6 SHEETS—SHEET 2.
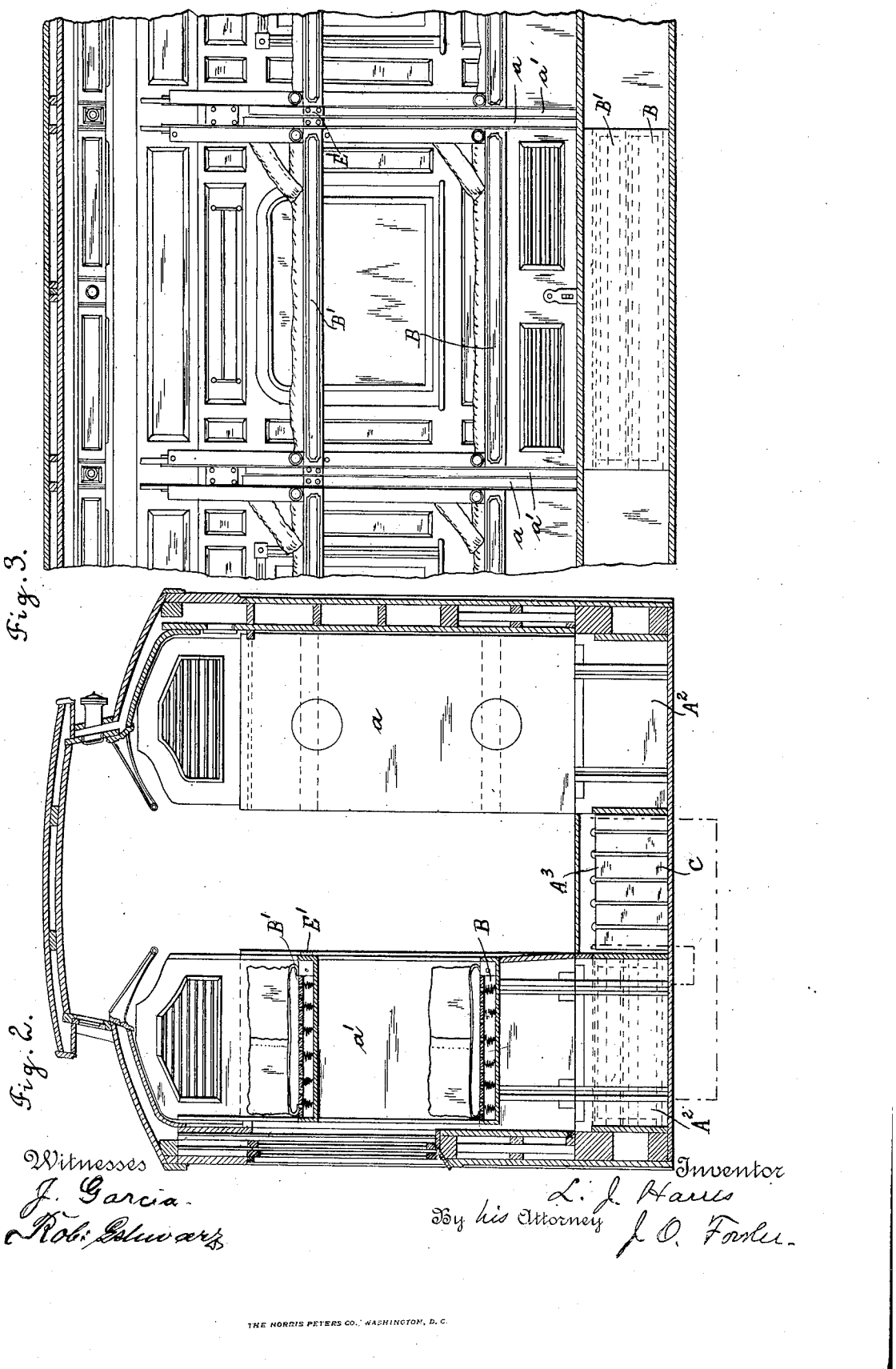

No. 829,469.
PATENTED AUG. 28, 1906.
L. J. HARRIS.
PARLOR AND SLEEPING CAR HAVING ELECTRICALLY CONTROLLED BERTHS.
APPLICATION FILED MAY 23, 1906.
6 SHEETS—SHEET 3.
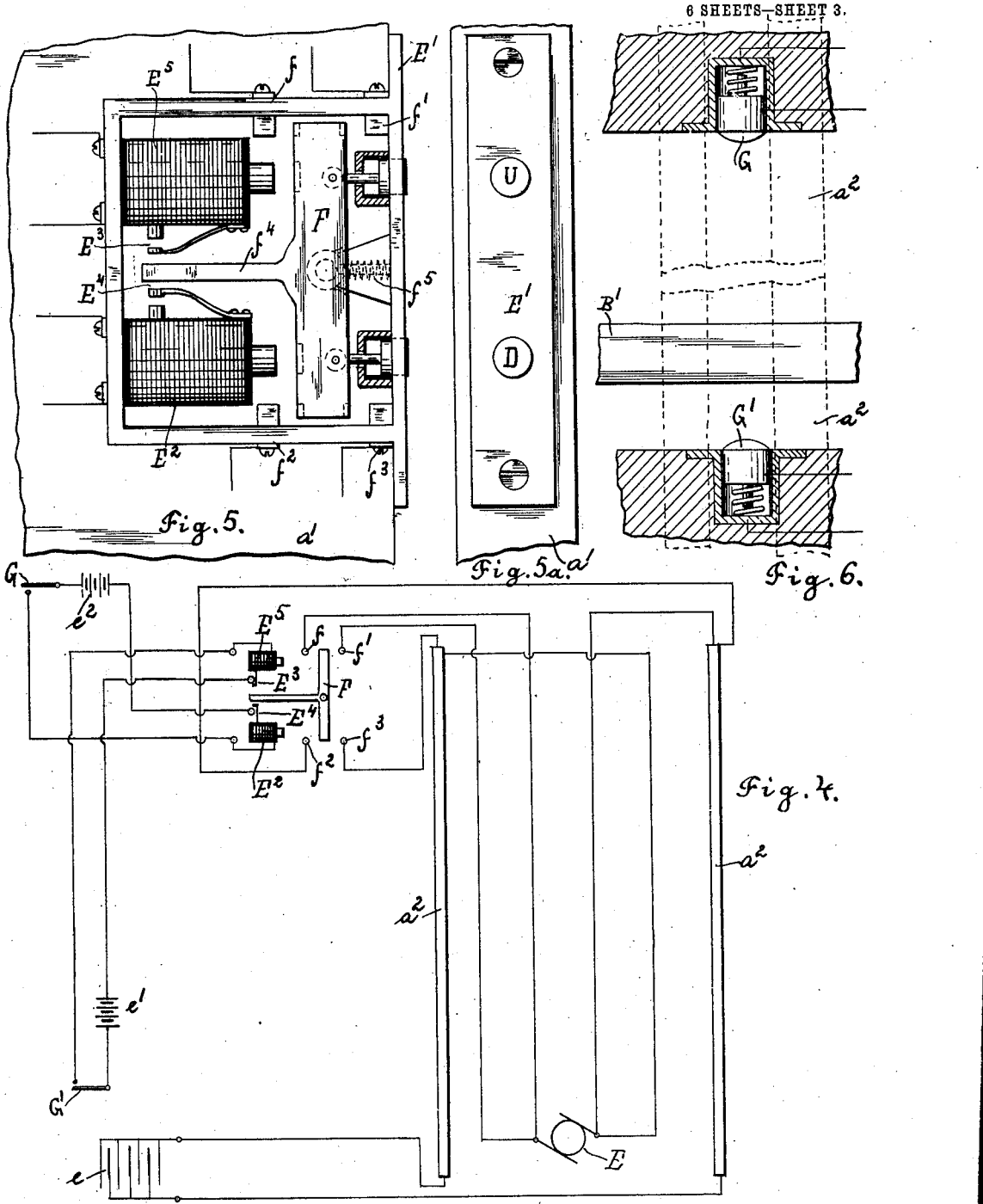
Witnesses
L. J. Harris Inventor
By his Attorney No. 829,469. PATENTED AUG. 28, 1906.
L. J. HARRIS.
PARLOR AND SLEEPING CAR HAVING ELECTRICALLY CONTROLLED BERTHS.
APPLICATION FILED MAY 23, 1906.

6 SHEETS—SHEET 4.

Witnesses
J. Garcia
Rob. Schwarz

L. J. Harris Inventor
By his Attorney

No. 829,469. PATENTED AUG. 28, 1906.
L. J. HARRIS.
PARLOR AND SLEEPING CAR HAVING ELECTRICALLY CONTROLLED BERTHS.
APPLICATION FILED MAY 23, 1906.
6 SHEETS—SHEET 5.
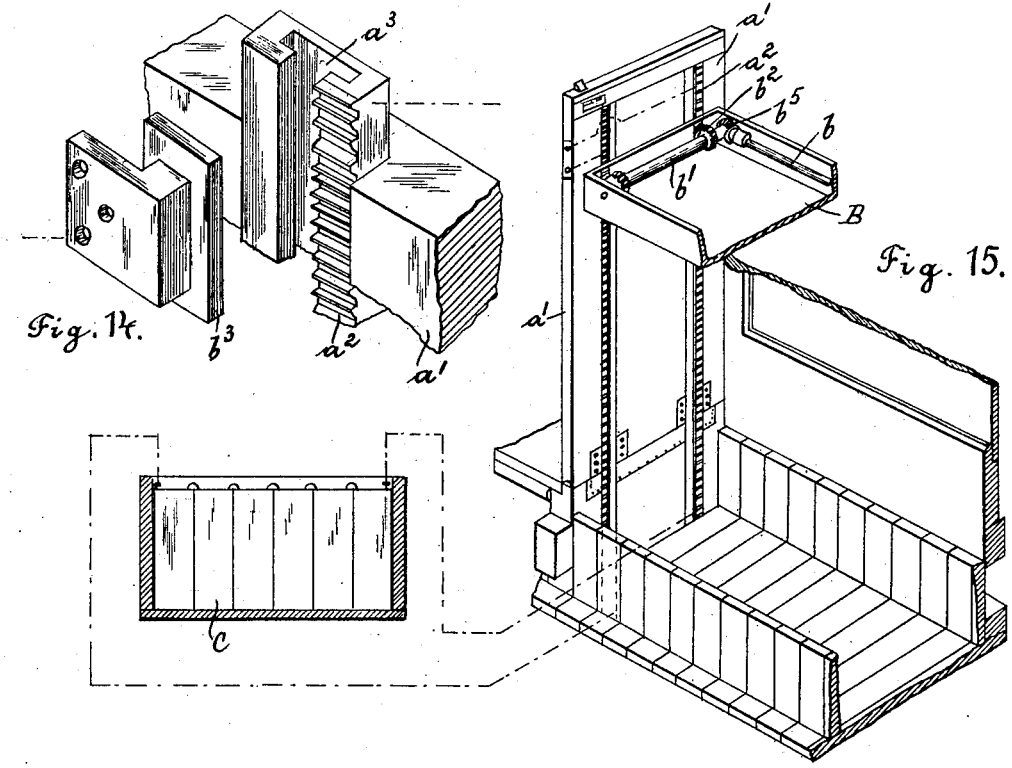
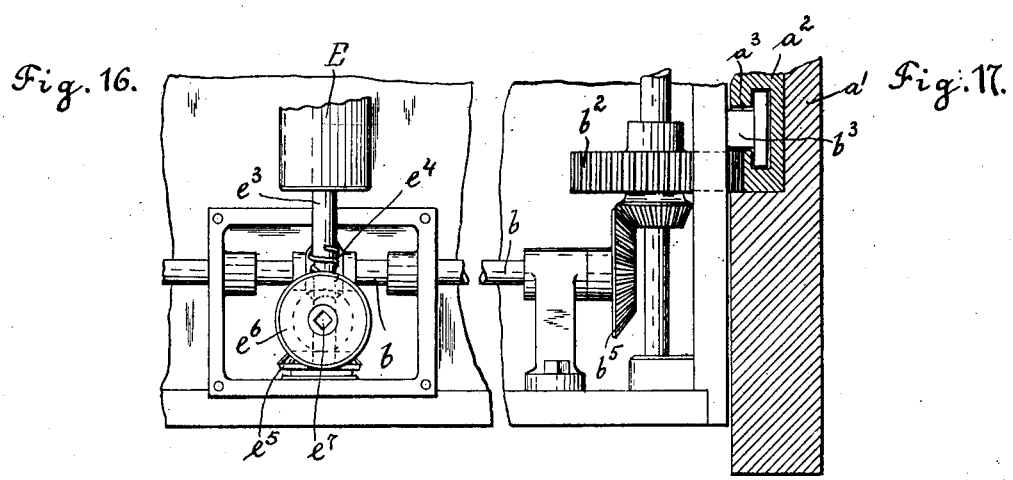
Witnesses
J. Garcia.
Rob. Schwarz.
L. J. Harris, Inventor.
By his Attorney J. O. Fowler.

No. 829,469. PATENTED AUG. 28, 1906.
L. J. HARRIS.
PARLOR AND SLEEPING CAR HAVING ELECTRICALLY CONTROLLED BERTHS.
APPLICATION FILED MAY 23, 1906.
6 SHEETS—SHEET 6.
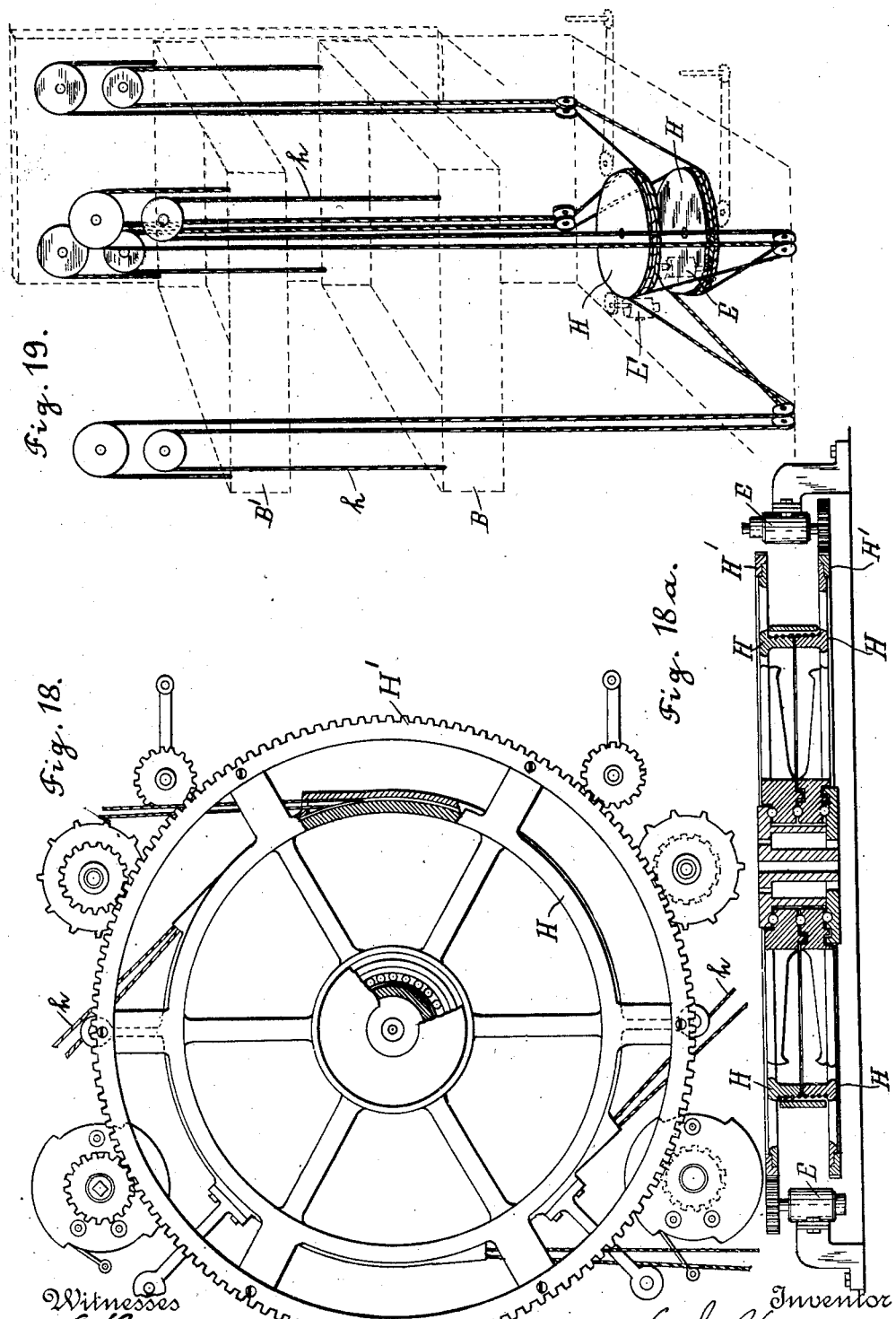

UNITED STATES PATENT OFFICE.

LOUIE J. HARRIS, OF NEW YORK, N. Y.

PARLOR AND SLEEPING CAR HAVING ELECTRICALLY-CONTROLLED BERTHS.

No. 829,469.  Specification of Letters Patent.  Patented Aug. 28, 1906.

Application filed May 23, 1906. Serial No. 318,413.

*To all whom it may concern:*

Be it known that I, LOUIE J. HARRIS, a citizen of the United States of America, and a resident of New York, in the county of New York and State of New York, have invented a certain new and useful Parlor and Sleeping Car Having Electrically-Controlled Berths, of which the following is a specification, the same being a full, clear, and exact description of the invention, such as will enable others skilled in the art to which it appertains to make and use the same.

This invention relates to combined parlor and sleeping cars or coaches, and in particular to a car in which are provided means for containing the berths and storage batteries beneath the floor of the car and in which provision is made for the raising, by electrical means, of the berths out of their storage-compartments and supporting the same between the floor-sections forming the side walls or partitions thereof and, when desired, lowering the same in the said storage-apartments. The invention also embodies certain novel features of construction and combination and arrangement of parts forming in operation a simple and efficient organization. To attain the desired end, the invention consists in the construction, arrangement, and operation of parts herein set forth.

In order to enable the invention to be fully understood, I will proceed to explain the same by reference to the drawings, illustrative of one embodiment of the invention, which accompany and form a part of the specification, and in which—

Figure 7:
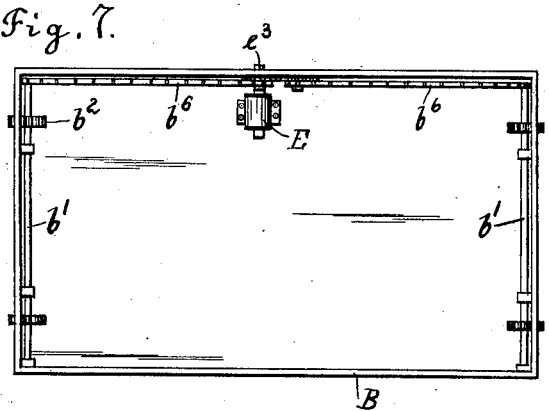

Figure 1 represents a side elevation of a car containing storage-compartments located between the trucks thereof. Figs. 2 and 3 are respectively transverse and longitudinal sections taken through the central portion of the car where the storage pockets or compartments are placed, showing the location of the batteries and of the berths in their raised and lowered positions. Fig. 4 is a diagrammatical view of the electric circuit and connections. Figs. 5, 5ª, and 6 are views in detail of the electric switches. Figs. 7, 7ª, 8, 9, 10, 10ª, and 11 represent views in detail of electrically-controlled berths in which this invention is embodied. Figs. 12, 13, 14, 15, 16, and 17 are views in detail of mechanism for producing the movement of the berths, and Figs. 18, 18ª, and 19 are views of other means of operating the berths made according to this invention.

Like letters of reference indicate like parts in all the views.

Referring particularly by letter to the drawings, A denotes a railway car or coach having a hang-down A' between the trucks to provide berth-storage compartments or pockets A² for the berth trays or beds B' and also to afford room, as at A³, to contain storage batteries C.

The floor of the car above the compartments preferably consists of two folding overlapping trap-doors or floor-sections $a$ $a'$, which when raised up in order to convert the parlor-car into a sleeping-car form the partitions or side walls of the sections of the car, which partitions are provided with toothed racks $a^2$ in the manner shown and described in my Patent No. 737,403, August 25, 1903, where also the berth trays or beds B B' are described and shown in connection with mechanical means for raising and lowering the same, as pinions $b^2$, to engage the side racks $a^2$ at each end thereof. The pinions $b^2$ are mounted on a shaft $b'$, which carries at its ends bevel-gears $b^5$, constructed and arranged to engage similar bevel-gears carried by the rod $b$.

The rack-bars are formed with grooves $a^3$, in which work T-shaped projections $b^3$, extending from the ends of the berth-trays. If, therefore, the rod $b$ be turned or caused to rotate, it follows that the berth-tray must be either raised or lowered. In order to accomplish this movement by electrical means, I provide a motor E, ordinarily located in the berth-tray. This motor is connected with a source of power, as the storage battery C, which may be charged or supplied with electrical energy by any suitable means, as by the use of a dynamo directly attached to or connected with one axle of the wheels of the car in the well-known manner.

We will suppose the berth trays or beds to be located in the storage-compartments beneath the floor and the trap-doors or sections $a$ $a'$ raised to a vertical position, so as to provide double partitions between each berth-section of the car. Each floor-section forming a part of the partition is provided with a switch, as the switch E', controlled and operated by two push-buttons, (marked, respectively, U and D, signifying "up" and "down." The switch E', attached to the floor-section $a$ at one end of the berth, may control the upper-berth tray or bed, and the switch E', attached to the floor-section $a'$, forming the partition at the other end of the berth, may control the lower-berth tray, or vice versa.

Figure 8:
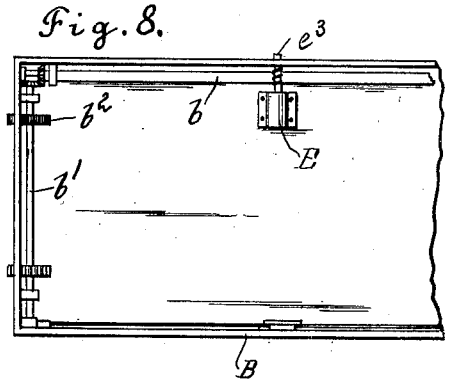
Figure 7A:
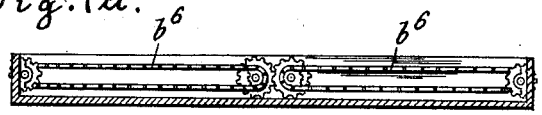
Figure 12:
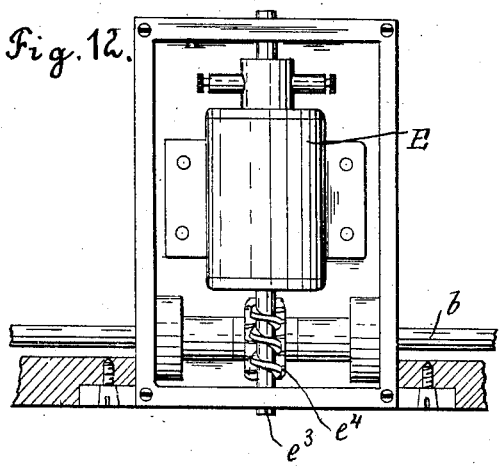
Figure 13:
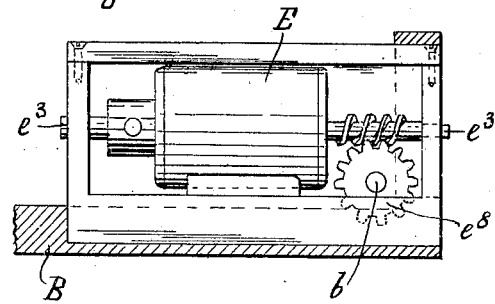
Figure 9:
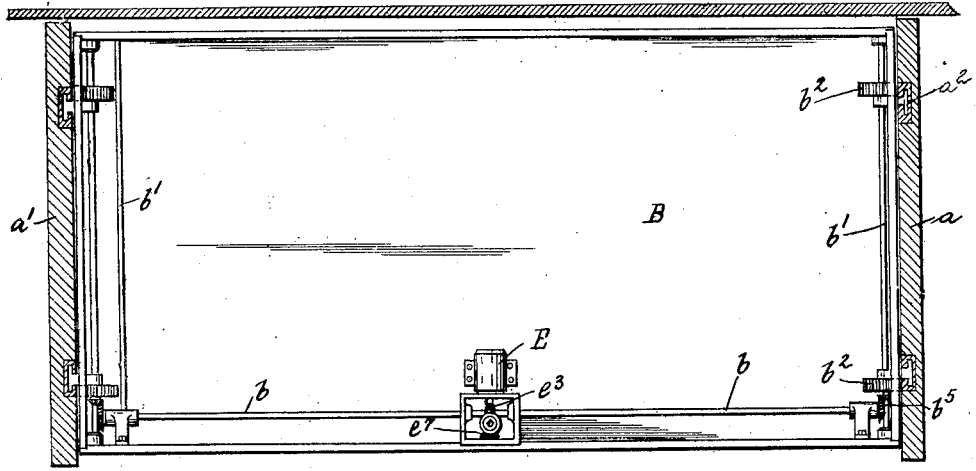
Figure 10:
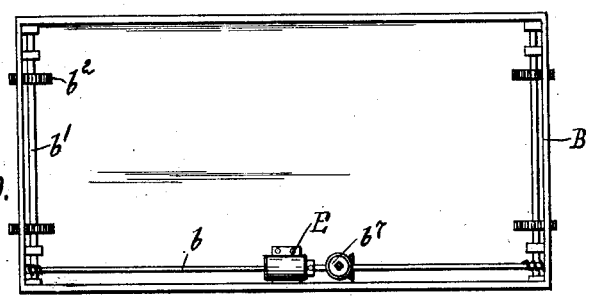
Figure 10A:
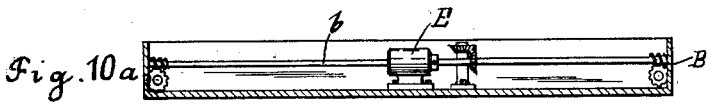
Figure 11:
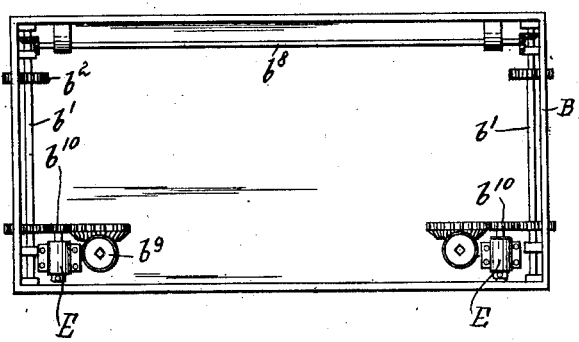

Now upon looking at the construction shown in Figs. 9 and 15, (where the rod $b$ may be located either along the front of the berth-tray, as shown in Fig. 9, or at the rear of the same, as illustrated in Fig. 15,) in connection with the detail views Figs. 15 and 16, it will be seen that upon the motor E being set in operation its shaft $e^3$ will cause the rod $b$ to be rotated by means of the engagement of a gear-wheel carried by the same with a worm $e^4$ of the motor-shaft, and the gears $b^2$ and $b^5$ will be turned. A bevel-gear $e^5$ is also mounted on the shaft $e^3$, which meshes with another bevel-gear $e^6$, which is provided with means, as the square hole $e^7$, constructed and arranged to be engaged by a key, by which the parts may be operated manually in case the electrical apparatus has become accidentally disarranged. When the push-button U of the switch E' is operated, the berth-trays being still retained in the compartment $A^2$, an electrical connection will be established between the points $f$ and $f^3$, and the electric current will flow through the battery $e$, through the rack-bar $a^2$, and through the motor E in one direction, and then through the points $f$ and $f^3$ and lever F back to the battery through the other rack-bar $a^2$. The berth-tray, as B', containing the motor E, which has been set in operation, will now rise until it strikes the switch G at the limit of its upward movement, whereupon a circuit will be completed between the battery $e^2$ and switch $E^4$, thereby energizing the electromagnet $E^2$, whereupon the pivoted lever F, which acts as an armature, will be attracted, thus breaking the connection between the points $f$ and $f^3$. At this moment, however the circuit of the electromagnet $E^2$ is broken by the opening of the switch $E^4$, whereupon the spring $f^5$ will serve to bring the lever F back to its normal median position, and the parts will remain stationary for any desired length of time. Upon now operating the push-button D of the switch E' an electric connection will be established between the points $f'$ and $f^2$, and the current will flow through the motor E in an opposite direction, and the berth-tray will fall until it engages with the switch G' at the limit of its downward movement, whereupon the switch $E^3$ will be closed and the electromagnet $E^5$ will be energized, thus actuating the lever F and stopping the motor, after which the switch $E^3$ will be opened again in the manner described above, whereupon all the parts will remain again stationary. The motor E is preferably placed close to the front edge of the berth, as shown in Figs. 7, 8, 9, and 10, and the manually-actuated device to operate the connection may be applied directly to the motor-shaft $e^3$, which may project from the edge of the berth-tray, as illustrated in Figs. 7, 12, and 13. In Figs. 8, 12, and 13 the motor is mounted at right angles to the rod $b$ and connected therewith by a gear-wheel $e^8$, mounted on the rod, and a worm placed on the motor-shaft $e^3$. The shafts $b'$ may be rotated by endless chains $b^6$, as in Figs. 7 and $7^a$, the movement of which is controlled by the motor E, or the motor-armature may be mounted directly on the rod $b$, as shown in Figs. 10 and $10^a$, the same being connected by bevel-gears with a manually-actuating wheel $b^7$, which may be operated by means of any suitable detachable key. If preferred, each shaft $b'$, placed at the sides of the berth-tray, may be connected by a rod $b^8$ and may be each actuated by a separate motor E through gears $b^{10}$, and in this case manually-actuating wheels $b^9$ are provided, which are connected up to the gears $b^{10}$, as shown in Fig. 11.

Another method of electrically raising and lowering the berths is shown in Figs. 18 and 19, where the berth-trays B and B' are respectively supported by ropes $h$ wound on drums H, the operation of which is controlled by gear-wheels H', which are rotated by means of pinions attached to the shafts of the motor E.

I wish it to be understood that I do not desire to be limited to the exact details of construction shown and described, for obvious modifications will occur to a person skilled in the art.

What I claim as my invention is—

1. In a railway passenger car or coach, a berth-storage compartment or pocket located beneath the floor of the car, a berth contained in said compartment, and electrically-operated means for raising the said berth above the floor.

2. In a railway passenger car or coach, a berth-storage compartment or pocket located beneath the floor of the car, a berth contained in said compartment, and electrically-operated means for raising the said berth above or lowering the same below the floor.

3. In a railway passenger car or coach, a berth-storage compartment or pocket located beneath the floor of the car, a plurality of berths contained in said compartment, and electrically-operated means for raising each of the said berths above or lowering the same below the floor.

4. In a railway passenger car or coach, a plurality of berth-storage compartments or pockets located beneath the floor of the car, a plurality of berths contained in each of said compartments and electrically-operated means for raising each of the said berths above or lowering the same below the floor.

5. In a railway passenger car or coach, a berth-storage compartment or pocket located beneath the floor of the car, a berth contained in said compartment, and electrically-operated means for raising the said berth above or lowering the same below the floor, and also a device for raising and lowering the said berth by manually-actuated means.

6. In a railway passenger car or coach, a plurality of berth-storage compartments or pockets located beneath the floor of the car, a plurality of berths contained in each of said compartments and electrically-operated means for raising each of the said berths above or lowering the same below the floor, and also devices for raising and lowering the said berths by manually-actuated means.

7. In a railway passenger car or coach, a compartment located beneath the floor, a berth normally contained therein, a motor, means to raise the berth controlled by the motor, and a switch to control the movement of the motor.

8. In a railway passenger car or coach, a compartment located beneath the floor, a berth normally contained therein, a motor, means to lower the berth controlled by the motor, and a switch to control the movement of the motor.

9. In a railway passenger car or coach, a compartment located beneath the floor, a berth normally contained therein, a motor, means to raise and lower the berth controlled by the motor, and a switch to control the movement of the motor.

10. In a railway passenger car or coach, a compartment located beneath the floor, a berth normally contained therein, a motor, means to raise the berth controlled by the motor, and a switch to control the movement of the motor, and also another switch operated by the movement of the berth to also control the movement of the motor.

11. In a railway passenger car or coach, a compartment located beneath the floor, a berth normally contained therein, a motor, means to lower the berth controlled by the motor, and a switch to control the movement of the motor, and also another switch operated by the movement of the berth to also control the movement of the motor.

12. In a railway passenger car or coach, a compartment located beneath the floor, a berth normally contained therein, a motor, means to raise and lower the berth controlled by the motor, and a switch to control the movement of the motor, and also two other switches operated by the movement of the berth to also control the movement of the motor.

13. In a railway passenger car or coach, a compartment located beneath the floor, a berth normally contained therein, a motor, means to raise the berth controlled by the motor, and a switch to control the movement of the motor, and also a manually-actuated device to raise the said berth.

14. In a railway passenger car or coach, a compartment located beneath the floor, a berth normally contained therein, a motor, means to lower the berth controlled by the motor, and a switch to control the movement of the motor, and also a manually-actuated device to lower the said berth.

15. In a railway passenger car or coach, a compartment located beneath the floor, a berth normally contained therein, a motor, means to raise and lower the berth controlled by the motor, and a switch to control the movement of the motor, and also a manually-actuated device to raise and lower the said berth.

In testimony of the foregoing specification I do hereby sign the same, in the city of New York, county and State of New York, this 15th day of May, 1906.

LOUIE J. HARRIS.

Witnesses:
   Rob. Schwarz,
   J. O. Fowler.